United States Patent
Korhonen et al.

(10) Patent No.: US 11,659,603 B2
(45) Date of Patent: May 23, 2023

(54) METHOD OF COMMUNICATION BETWEEN A DEVICE AND A NETWORK

(71) Applicant: Nordic Semiconductor ASA, Trondheim (NO)

(72) Inventors: Jouni Korhonen, Trondheim (NO); Veli-Pekka Junttila, Trondheim (NO); Jukka Luippunen, Trondheim (NO); Tuomo Kumento, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 169 days.

(21) Appl. No.: 17/255,919

(22) PCT Filed: Jul. 1, 2019

(86) PCT No.: PCT/EP2019/067556
§ 371 (c)(1),
(2) Date: Dec. 23, 2020

(87) PCT Pub. No.: WO2020/002700
PCT Pub. Date: Jan. 2, 2020

(65) Prior Publication Data
US 2021/0251022 A1    Aug. 12, 2021

(30) Foreign Application Priority Data

Jun. 29, 2018  (GB) ..................... 1810768

(51) Int. Cl.
*H04W 76/10*    (2018.01)
*H04W 80/02*    (2009.01)
(Continued)

(52) U.S. Cl.
CPC ........... *H04W 76/10* (2018.02); *H04W 80/02* (2013.01); *G16Y 10/75* (2020.01); *H04L 2101/345* (2022.05); *H04L 2101/35* (2022.05)

(58) Field of Classification Search
CPC . H04W 76/10; H04W 80/02; H04W 52/0216; H04W 52/0219; H04W 52/0229;
(Continued)

(56) References Cited

U.S. PATENT DOCUMENTS

2001/0053694 A1*  12/2001  Igarashi ................. H04L 63/08
                                                                    455/433
2005/0111382 A1    5/2005  Le et al.
(Continued)

FOREIGN PATENT DOCUMENTS

EP    1 643 723 A2    4/2006
EP    2 689 567 A1    1/2014
(Continued)

OTHER PUBLICATIONS

IPO Search Report under Section 17(5) for GB1810768.0, dated Dec. 6, 2018, 3 pages.
(Continued)

*Primary Examiner* — Steven H Nguyen
(74) *Attorney, Agent, or Firm* — Klarquist Sparkman, LLP

(57) ABSTRACT

A method of communication between an electronic device and a cellular network employing a communication protocol is disclosed. The device initiates a connection with the network and during the initiation the device issues to the network at least one information criterion. Once the connection is established, the network forwards to the device only communications required by said communication protocol and any communications which meet the information criterion issued by the device.

8 Claims, 3 Drawing Sheets

(51) Int. Cl.
   *G16Y 10/75*      (2020.01)
   *H04L 101/35*     (2022.01)
   *H04L 101/345*    (2022.01)

(58) Field of Classification Search
   CPC .............. G16Y 10/75; H04L 2101/345; H04L
              2101/35; H04L 67/141; H04L 63/0236;
                                      Y02D 30/70
   See application file for complete search history.

(56)              References Cited

U.S. PATENT DOCUMENTS

| 2013/0077491 | A1  | 3/2013  | Cherian et al. |            |
| 2017/0163819 | A1* | 6/2017  | Zhou ........................ | H04W 4/24   |
| 2017/0303322 | A1* | 10/2017 | Watfa ..................... | H04W 76/23  |
| 2018/0302935 | A1* | 10/2018 | Kawasaki ............. | H04W 48/18  |
| 2019/0254118 | A1* | 8/2019  | Dao ....................... | H04L 67/141 |
| 2019/0387428 | A1* | 12/2019 | Ahmad ................. | H04W 28/12  |
| 2020/0359291 | A1* | 11/2020 | Ramle .............. | H04W 36/0055 |

FOREIGN PATENT DOCUMENTS

| EP | 3 306 961 A1     | 4/2018 |
| WO | WO 01/33889 A1   | 5/2001 |
| WO | WO 2012/127288 A1 | 9/2012 |

OTHER PUBLICATIONS

International Search Report and Written Opinion for PCT/EP2019/
067556, dated Aug. 30, 2019, 14 pages.

* cited by examiner

METHOD OF COMMUNICATION BETWEEN A DEVICE AND A NETWORK

CROSS REFERENCE TO RELATED APPLICATIONS

This is the U.S. National Stage of International Application No. PCT/EP2019/067556, filed Jul. 1, 2019, which was published in English under PCT Article 21(2), which in turn claims the benefit of Great Britain Application No. 1810768.0, filed Jun. 29, 2018.

BACKGROUND OF THE INVENTION

This invention relates to electronic device, for example cellular internet-of-things devices (CIoT), and in particular to a mechanism for connecting such an electronic device to a cellular network. By connecting such devices to a cellular network it is possible to use existing cellular technology and infrastructure to connect these devices to each other and to the Internet. This allows the cellular network to communicate data packets to the devices. A particular device does not need to receive all data packets which might be delivered from the network, it is therefore desirable to provide a mechanism for filtering which packets are forwarded to the device.

One existing filtering mechanism is a Port Control Protocol (PCP) RFC6887, defined by the Internet Engineering Task Force, which allows a host with an IP address to control how incoming packets are translated and forwarded. This protocol allows equipment and applications to create mappings between an external IP address, protocol and port with an internal IP address, protocol and port and thereby perform packet filtering. However, this mechanism can be used only after a device has established IP communication.

The present invention seeks to address shortcomings with such a filtering system.

SUMMARY OF THE INVENTION

From a first aspect, the invention provides a method of communication between an electronic device and a cellular network employing a communication protocol, comprising: the device initiating a connection with the network, wherein during the initiation the device issues to the network at least one information criterion; and wherein once the connection is established, the network forwards to the device only communications required by said communication protocol and any communications which meet the information criterion issued by the device.

From a second aspect the invention provides an electronic device suitable for connection to a cellular network employing a communication protocol; wherein the device is configured during initiation of a connection to a cellular network, to transmit at least one information criterion representing communications which the device expects to receive in addition to any communications required by the protocol employed by the network.

Thus it will be seen that, in accordance with the invention, criteria are provided to the network so that the network can filter which communications are sent to the device and thereby avoid unnecessary paging of the device or delivering of packets to the device which the device would in any case silently drop. This improves the power consumption of the device. Furthermore providing these criteria to the network during initiation of a connection to the network provides the advantage that the filters are in place when IP connectivity is enabled such that they can be used immediately. Furthermore, since the filters are established during the initiation of a connection to the network, the filters are therefore linked to the lifetime of the network connection and last until the present connection to the network ends. The filters therefore do not require to be periodically refreshed.

The device initiating a connection with the network can occur in a number of ways. In a set of embodiments the device initiates a PDN connection or protocol data unit (PDU) session. A PDN is a packet data network which is an external IP network, for example the Internet is a packet data network. These are types of known connection which can be made to currently used networks, although other kinds of network connection are also possible within the scope of this invention.

The information criterion issued by the device to the network could be one or more of a large number of criteria. In some embodiments the information criterion includes the IP address or addresses of the UE itself. In some embodiments the information criterion includes UDP port numbers. In some embodiments the information criterion includes TCP port numbers. In some embodiments the information criterion includes a particular protocol. These criteria may correspond to the properties of certain communications which the device expects to receive, or wishes to receive, for example the criteria may specify a particular UDP port number from which the device expects to receive a communication once the connection to the network is established.

In a set of embodiments the information criterion issued by the device can include a "wildcard" which represents the address(es) or prefix(es) which the device is later assigned by the network. This has the advantage that the filtering can be set up before the device is assigned its IP addresses or prefixes.

In a set of embodiments the device issuing the information criterion comprises the device including the criterion in an (e)PCO. Preferably the (e)PCO is issued to the network in a connectivity request. PCOs (protocol configuration options) and ePCOs (extended protocol configuration options) are used to transfer configuration parameter information between user equipment and a network data gateway, for example a packet network data gateway (PGW) or session management function (SMF) or user plane function (UPF), which is related to the 3GPP 5G architecture and plays a similar role to the role played by a packet gateway at a user plane in a 4G LTE system. An ePCO is similar to a PCO but allows a payload larger than 253 bytes. ePCOs can be used to transport filter rules, alternatively legacy PCOs can be used. The term (e)PCO used throughout refers to both a PCO and an ePCO.

In a set of embodiments the information criterion positively indicates which communications are to be forwarded by the device, such that if the information criterion issued to the network is empty then the network blocks all communications to the device other than the protocol required communications. However this is not essential and it could be arranged that all information is sent except that indicated in the criterion.

In a set of embodiments the network ceases to forward only communications meeting the at least one information criterion to the device when a previously established connection ceases. This has the advantage that the filters are tied to a particular network connection session and therefore when a particular network connection ceases, then the filtering set up when said network connection was initiated also ceases.

Features of any embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

An embodiment of the invention will now be described, by way of example only, with reference to the accompanying drawings, in which.

DETAILED DESCRIPTION

Figure 1:
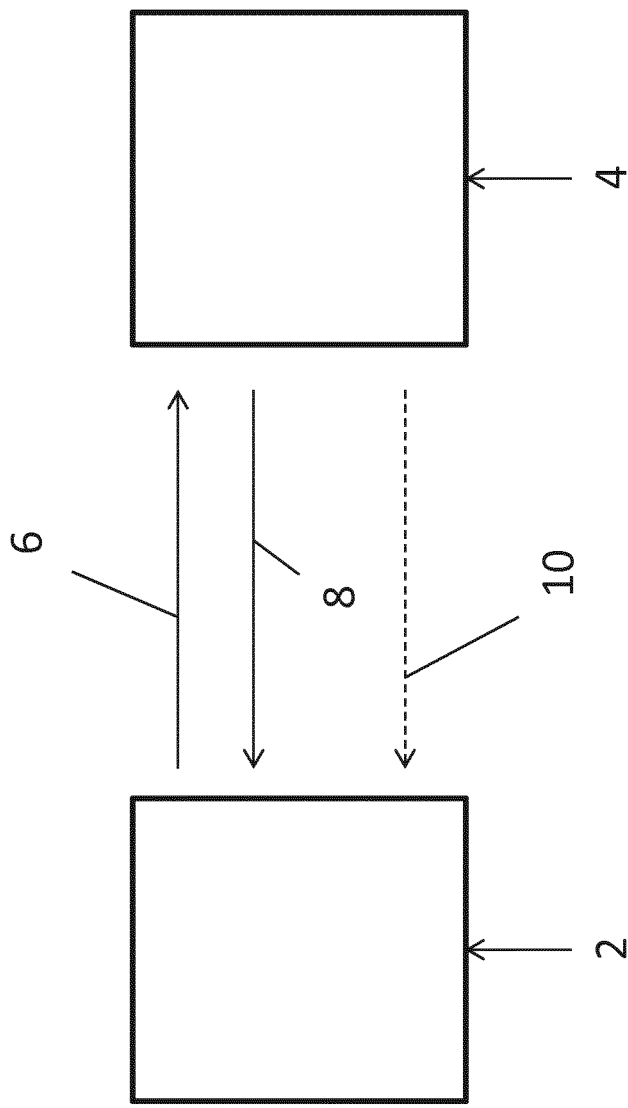
FIG. 1 shows schematically a cellular device in connection with a network.

FIG. 1 shows schematically a portable electronic device also known as User Equipment (UE) 2 and a network 4. The device 2 is a cellular Internet-of-Things device and the network 4 is a cellular network, which can be a packet data network (PDN) through which a UE obtains a packet data connection to the Internet.

In order for the UE 2, to connect to the network 4, the UE issues a packet data network (PDN) connectivity request 6 to the network. This PDN connectivity request 6 carries a NAS message, one component of which is a PCO (protocol configuration options), or ePCO (extended protocol configuration options). PCOs or ePCOs are used to transfer, for example, IP configuration related parameters between user equipment and a network data gateway, for example a packet network data gateway (PGW) or session management function (SMF) or user plane function (UPF), which is related to the 3GPP 5G architecture and plays a similar role to the role played by a packet gateway at a user plane in a 4G LTE system. In an attach request the UE 2 provides a list of (empty) configuration parameters within (e)PCOs which requests the network to provide configuration information. The network then returns matching configuration parameters within (e)PCOs to the UE 2 with the requested paramaters, for the configuration parameters which it is able to match. The issuing of this connectivity request 6 is shown at step 20 in FIG. 2.

The UE 2 uses these (e)PCOs to communicate configuration information criteria to the network 4 which represent the data the UE 2 expects to receive. Specifically, the UE uses (e)PCOs to communicate to the network the IP address or addresses which it expects to have, the UDP and TCP port numbers which it expects to receive messages from, and the next protocol it expects to receive.

As is known in the art, UDP (user datagram protocol) is a connectionless transport layer protocol used along with IP. It is not designed to support reliable transfer of data and data packets may arrive out of sequence, or be lost without notice in this protocol.

As is known in the art, TCP (transmission control protocol) is a connection-oriented reliable host-to-host protocol used in packet-switched communication networks together with the IP. The IP handles transmission of the packets, and the TCP handles control of packets, for example requesting re-transmission of any lost packets and re-ordering packets which are out of sequence.

If the UE 2 does not know its IP addresses or prefixes at transmission of the connectivity request 6, then it can issue a "wildcard" address or prefix in the (e)PCO filter configuration information which is used to mean the address(es) or prefix(es) which a packet network data gateway (PGW) or SMF assigns to the UE. The UE may be assigned multiple addresses or prefixes, and the "wildcard" can be used to mean all of those. Specifically the "wildcard" used in this embodiment is INADDRANY (0.0.0.0 or::/0).

The device 2 then receives a response 8 from the network 4, indicating whether the connection has been established and also whether the network supports filtering using the information criteria provided by the device. This process is shown at stage 22 of FIG. 2. If the response from the network does not contain a filter configuration in an (e)PCO then this indicates that the network does not support the filtering feature. If the network cannot apply the criteria provided in the (e)PCO then the network will respond with an (e)PCO containing failed filters and only their respective filter indexes.

There are certain communications which are required by a given protocol in order to maintain a connection between a device and a network. The network 4 will not filter any of these communications and will forward all such communications to the device 2. For all other communications, which are not required by the particular protocol which is in use, once the connection is established between the UE 2 and the network 4, the network compares the properties of data on the network 8 with the information criteria supplied by the UE 2.

The filters are encoded following the Traffic Flow Template (TFT) encoding described in TS24.008 Section 10.5.6.12 with a number of changes. The packet filters do not specify a particular direction as all the filter rules are for the downlink direction. Only two actions are required resulting from a particular filter, either to delete the packet, or to forward the data packet. A particular filter can include a "stateful rule" so that the filter activates only when the UE 2 first initiates traffic that the firewall can build a stateful rule for. For example, the UE could establish a rule allowing traffic coming from IP address 192.168.11.22 but the rule would activate only when the node which does the packet filtering first sees a packet originating from the UE and destined for IP address 192.168.11.22. Before this occurs all traffic from the IP address 192.168.11.22 is blocked by the network.

In some embodiments the device includes a radio, which can be in a connected mode or in an idle mode. A filter can include a flag bit which activates that filter only when the UE 2 is in radio connected mode. This filter is active only when radio connectivity is established, and when the UE is not in the connected mode traffic coming from the network which would match the (now inactive) filter rules does not cause the network to page the UE. There is no need for the filters to have precedence in this case because there will not be conflicting filter rules. The information criteria used to establish these filter rules are added into an (e)PCO by the UE2 during the creation of the PDN connection/PDU session. If the network 4 initiates the creation of a connection then the UE has to set up the filter rules after the establishment of the connection. If the (e)PCO communicates an empty filter rule to the network then all network initiated traffic, other than the communications required by the protocol, is blocked in the network. In this case the gateway (e.g PGW) blocks all traffic coming from the PDN (e.g Internet) towards the UE, there is some traffic generated within the PGW, for example IPv6 Neighbour Discovery protocol related traffic, which is not affected by the filtering.

Figure 3:
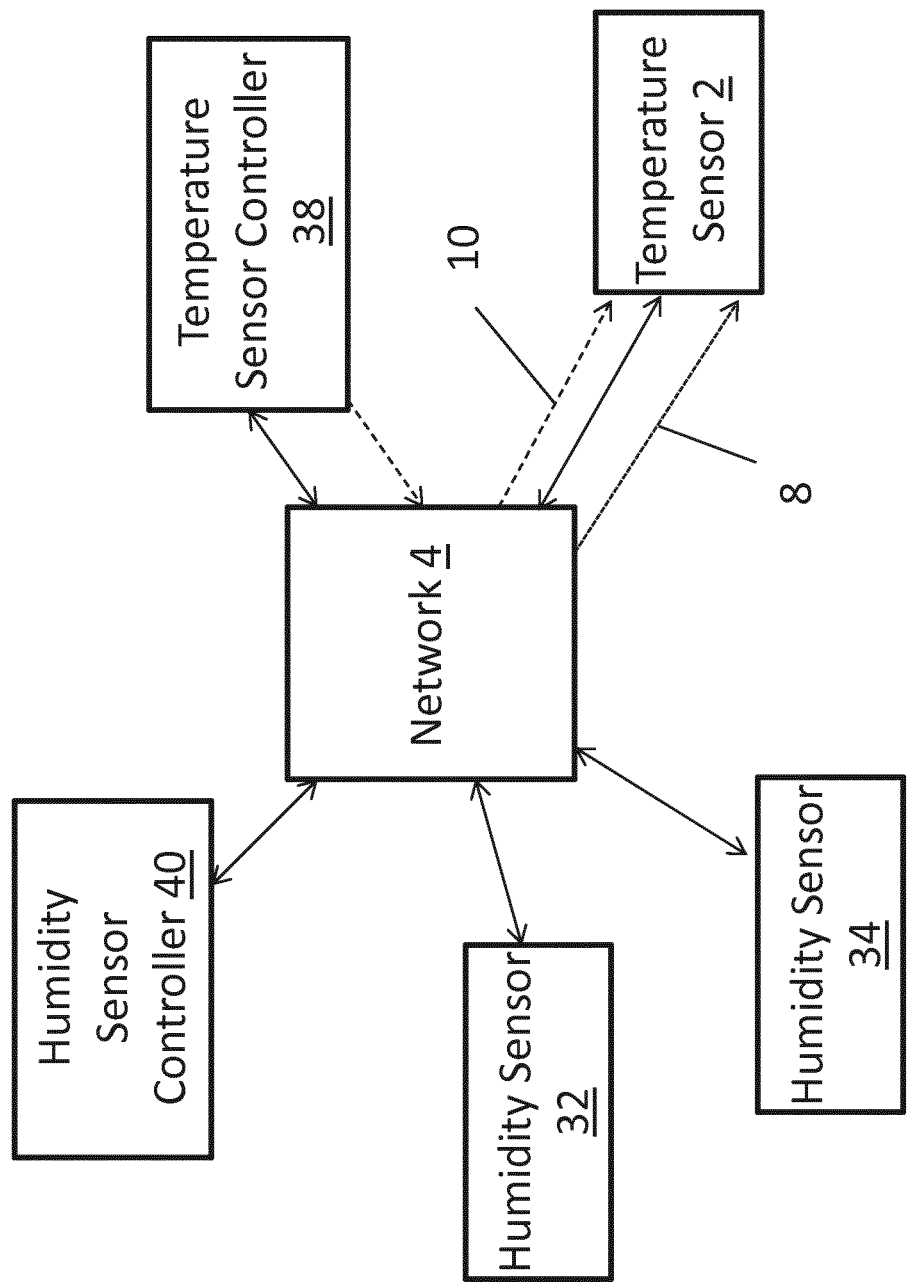
FIG. 3 is an illustrative example showing a number of sensors and controllers connected to a network.

One example in which filtering as described above is useful, is the case where the device 2 is an Internet-of-Things sensor connected to a network 4, to which several controllers are also connected. In one illustrative example, shown in FIG. 3, the sensor 2 is a temperature sensor, and there are other sensors 32, 34, in the network 4 which are humidity sensors, as well as two controllers 38 and 40, one of which 38 controls the temperature sensors and the other 40 controls the humidity sensors. As the sensor 2 establishes a connection to this network 4, it can include with its request certain information criteria, which specify that it would like to receive communications only from the temperature sensor controller 38. Once the connection is established the sensor 2 will receive a signal 8 which indicates whether the connection has been established successfully and whether the filter is in place. If the filter is in place then throughout the currently established connection the sensor 2 will receive only communications 10 from the temperature controller 38 as requested, and any protocol required communications, and will not receive any communications from the humidity controller 40.

Figure 2:
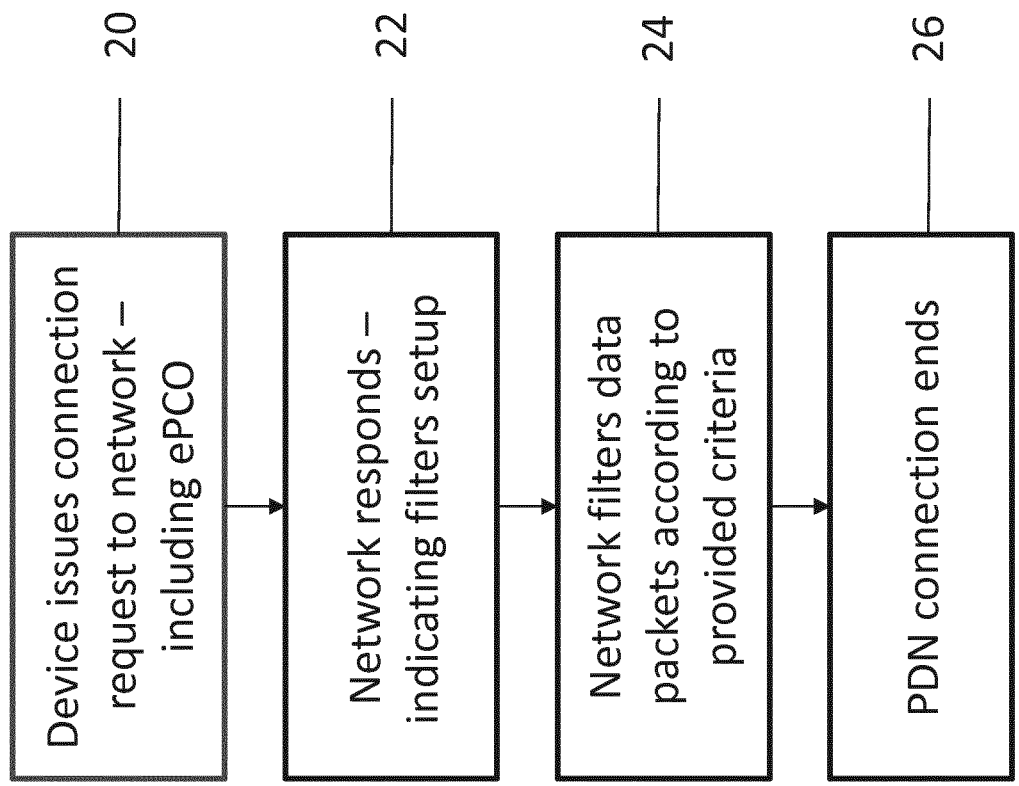
FIG. 2 is flow chart showing a method of communication between a device and a network in accordance with the invention.

The network 4 only forwards to the UE 2 data packets meeting the specified information criteria 10, and those which are required by the communication protocol employed by the network, and filters out those which do not meet the criteria, as shown at stage 24 of FIG. 2. This prevents unnecessary paging of the UE 2 or delivering packets to the UE 2 which the UE 2 will silently drop anyway. This has the advantage of improving power consumption of the UE. The filtering disclosed herein is particularly useful for filtering malicious behaviour on the Internet. It is known for a malicious attacker to scan the entire Internet for potential victim nodes to take over. Every scan matching the IP address of the IoT device 2 would wake up the device even if the packet is eventually dropped by the UE 2. This is prevented by the claimed method of filtering.

The filters are established during the setup of the connection between the UE 2 and the network 4, which provides the advantage that the filters are in place when IP connectivity is enabled.

Furthermore the filters are therefore linked to the PDN connection/PDU session lifetime, and last until the PDN connection ends, as shown at stage 26 of FIG. 2. They therefore do not require to be periodically refreshed.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A method of communication between an electronic device and a cellular network employing a communication protocol, comprising:

the device initiating a connection with the network, wherein during the initiation the device issues to the network at least one information criterion for communication protocol filtering rules;

the device receiving a response from the network indicating whether the connection has been established, and also whether the network supports communication protocol filtering rules using the information criterion provided by the device;

and wherein once the connection is established, if the network supports communication protocol filtering rules using the information criterion, the network forwards to the device only communications required by said communication protocol and any communications which meet the information criterion issued by the device, and blocks all other communications; and if the network does not support communication protocol filtering rules using the information criterion then the network forwards to the device communications which do not meet the information criterion, and the device then drops said communications which do not meet the information criterion.

2. The method of claim 1 wherein the device initiates a packet data network connection or protocol data unit session.

3. The method of claim 1 wherein the information criterion issued by the device includes at least one criterion selected from the group comprising: at least one IP address of the device, a user datagram protocol port number, a transmission control protocol port number, or a protocol.

4. The method of claim 1 wherein the information criterion issued by the device includes a wildcard in place of at least one address and/or at least one prefix to be assigned to the device later by the network.

5. The method of claim 1 wherein the device issuing the information criterion comprises the device including the criterion into a protocol configuration option or extended protocol configuration option.

6. The method of claim 5 comprising issuing the protocol configuration option or extended protocol configuration option to the network in a connectivity request.

7. The method of claim 1 wherein the at least one information criterion issued by the device positively indicates which communications are to be forwarded by the device.

8. The method of claim 1 further comprising said connection with the network ceasing, the device initiating a further connection with the network, wherein during the initiation of the further connection the device issues to the network at least one further information criterion;

and wherein once the further connection is established, the network forwards to the device only communications required by said communication protocol and any communications which meet the further information criterion issued by the device.

\* \* \* \* \*